United States Patent
Takla

(10) Patent No.: US 11,849,341 B2
(45) Date of Patent: Dec. 19, 2023

(54) SYSTEMS AND METHODS FOR SIMULATING WIRELESS USER EQUIPMENT AND RADIO ACCESS NETWORK MESSAGING OVER PACKET-BASED NETWORKS

(71) Applicant: Verizon Patent and Licensing Inc., Basking Ridge, NJ (US)

(72) Inventor: Mourad B Takla, Hillsborough, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 82 days.

(21) Appl. No.: 16/939,900

(22) Filed: Jul. 27, 2020

(65) Prior Publication Data

US 2022/0030448 A1 Jan. 27, 2022

(51) Int. Cl.
*H04W 24/06* (2009.01)
*H04W 8/26* (2009.01)
*H04W 48/10* (2009.01)

(52) U.S. Cl.
CPC ............. *H04W 24/06* (2013.01); *H04W 8/26* (2013.01); *H04W 48/10* (2013.01)

(58) Field of Classification Search
CPC ......... H04W 48/16; H04W 4/02; H04W 4/80; H04W 8/18
See application file for complete search history.

(56) References Cited

U.S. PATENT DOCUMENTS

| | | | |
|---|---|---|---|
| 9,455,919 B2* | 9/2016 | Senarath | H04W 28/0268 |
| 10,098,064 B2* | 10/2018 | McKibben | H04W 24/02 |
| 10,237,908 B2* | 3/2019 | Cao | H04W 36/04 |
| 10,470,079 B2* | 11/2019 | Christopherson | H04W 76/10 |
| 10,542,330 B2* | 1/2020 | Hopcraft | H04L 41/145 |
| 10,574,386 B2* | 2/2020 | Stephenson | H04B 17/345 |
| 10,805,831 B1* | 10/2020 | Sung | H04W 28/086 |
| 11,147,107 B2* | 10/2021 | Oak | H04W 72/04 |
| 2014/0057566 A1* | 2/2014 | Watfa | H04W 48/16 455/41.2 |
| 2017/0126411 A1* | 5/2017 | Piqueras Jover | H04L 9/3247 |
| 2017/0331577 A1* | 11/2017 | Parkvall | H04J 11/0079 |
| 2018/0054772 A1* | 2/2018 | Tan | H04W 40/12 |
| 2018/0160393 A1* | 6/2018 | Zeng | G01S 13/74 |
| 2018/0184413 A1* | 6/2018 | Rong | H04W 28/0247 |
| 2018/0241464 A1* | 8/2018 | Michaels | H04B 7/18539 |

(Continued)

FOREIGN PATENT DOCUMENTS

WO WO-2020049335 A1 * 3/2020 ......... H04L 63/0227

*Primary Examiner* — Wutchung Chu
*Assistant Examiner* — Berhanu D Belete

(57) ABSTRACT

A system described herein may provide a technique for the simulation of User Equipment ("UEs") and/or radio access network ("RANs") over packet-based networks. Virtual UEs ("vUEs") and virtual RANs ("vRANs") may each include a virtual physical layer ("vPHY") component that simulates the physical ingress and egress of radio frequency ("RF") traffic to and/or from the vUE, and the vRAN may include a vPHY component that simulates the physical ingress and egress of RF traffic to and/or from the vRAN. Geographical locations of the vUEs and coverage areas of the vRANs may be further simulated, in order to properly route traffic between respective vUEs and vRANs.

20 Claims, 12 Drawing Sheets

(56) References Cited

U.S. PATENT DOCUMENTS

| | | | |
|---|---|---|---|
| 2018/0302951 A1* | 10/2018 | Christopherson | H04W 88/10 |
| 2019/0058543 A1* | 2/2019 | Stephenson | H04W 80/08 |
| 2019/0104458 A1* | 4/2019 | Svennebring | H04L 45/42 |
| 2019/0132709 A1* | 5/2019 | Graefe | G08G 1/096716 |
| 2019/0159069 A1* | 5/2019 | Christopherson | H04W 76/12 |
| 2019/0222652 A1* | 7/2019 | Graefe | H04L 67/12 |
| 2019/0238229 A1* | 8/2019 | Chapman | H04B 10/25753 |
| 2019/0366208 A1* | 12/2019 | Peitzer | A63F 13/332 |
| 2020/0110627 A1* | 4/2020 | Chou | H04L 41/40 |
| 2020/0120482 A1* | 4/2020 | Parkvall | H04L 5/0053 |
| 2020/0162188 A1* | 5/2020 | Stephenson | H04B 17/345 |
| 2020/0259786 A1* | 8/2020 | Saarinen | H04L 61/30 |
| 2020/0259896 A1* | 8/2020 | Sachs | H04J 3/0667 |
| 2021/0321259 A1* | 10/2021 | Louafi | H04W 24/08 |
| 2021/0321460 A1* | 10/2021 | Taherzadeh Boroujeni | H04W 24/08 |
| 2021/0329456 A1* | 10/2021 | Preda | H04W 12/69 |

\* cited by examiner

US 11,849,341 B2

1

SYSTEMS AND METHODS FOR SIMULATING WIRELESS USER EQUIPMENT AND RADIO ACCESS NETWORK MESSAGING OVER PACKET-BASED NETWORKS

BACKGROUND

Wireless user equipment ("UE"), such as mobile telephones or other wireless communication devices, may wirelessly communicate with radio access networks ("RANs"). Wireless network providers may simulate certain aspects of UEs and/or RANs in order to test the functionality of such devices or networks.

DETAILED DESCRIPTION OF THE PREFERRED EMBODIMENTS

The following detailed description refers to the accompanying drawings. The same reference numbers in different drawings may identify the same or similar elements.

Embodiments described herein provide for the simulation of UEs and/or RANs over packet-based networks. For example, some embodiments may simulate UEs and/or RANs by way of containers, virtual machines, etc. A first container may, for instance, be associated with a virtual UE ("vUE") while a second container may be associated with a virtual RAN ("vRAN"). In accordance with embodiments described herein, the vUE and the vRAN may each include Layer 2 (e.g., data link layer) through Layer 7 (e.g., application layer) functionality that is respectively associated with UEs and RANs of a wireless network. Further in accordance with some embodiments, the vUE may include a virtual physical layer ("vPHY") component that simulates the physical ingress and egress of RF traffic to and/or from the vUE, and the vRAN may include a vPHY component that simulates the physical ingress and egress of RF traffic to and/or from the vRAN.

As described herein, some embodiments may properly route traffic to and/or from one or more vUEs and vRANs via a Packet Data Network ("PDN"). Further, geographical locations and/or RF channel conditions of vRANs and/or vUEs may be simulated, and embodiments described herein may take simulated geographical locations and/or simulated RF channel conditions into account when routing messages between vUEs and vRANs.

Figure 1:
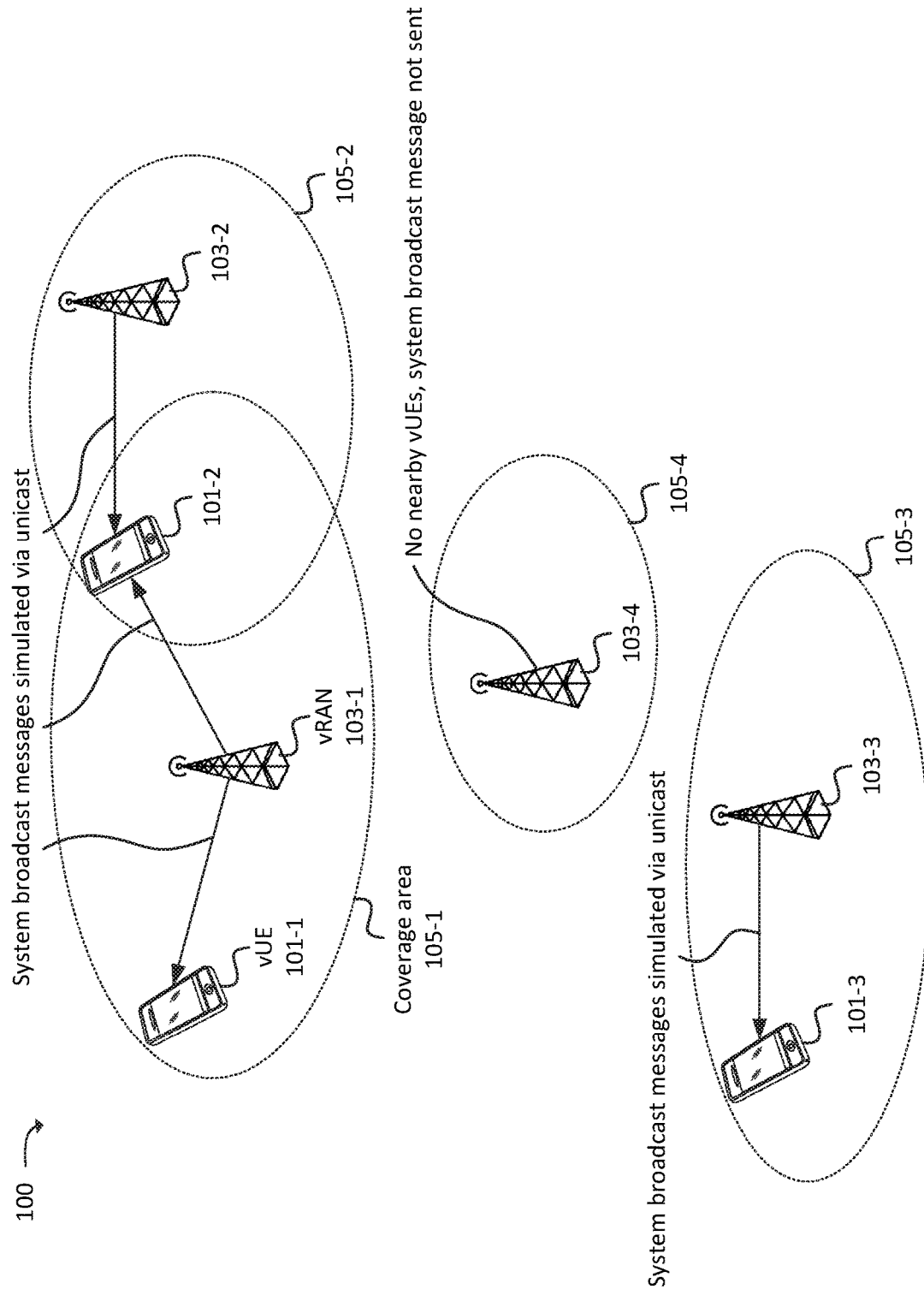
FIG. 1 conceptually illustrates an example overview of one or more embodiments described herein, in which virtual UEs ("vUEs") and virtual RANs ("vRANs") may be simulated.

As shown in FIG. 1, virtual environment 100 may include a set of vUEs 101-1 through 101-3 (sometimes referred to herein individually as "vUE 101" or collectively as "vUEs 101") and a set of vRANs 103-1 through 103-4. As further described herein, vUEs 101 and/or vRANs 103 may each be simulated by way of a container, virtual machine, or the like. As such, vUEs 101, vRANs 103, and/or components thereof may each be associated with a suitable address, locator, identifier, or the like at the container or virtual machine level. Such addresses, locators, identifiers, etc. may include or may be an Internet Protocol ("IP") address, hostname, or other suitable address, locator, identifier, etc. For the sake of brevity, examples provided herein will refer to such suitable addresses or identifiers in the context of an IP address.

Additionally, RAN-level identifiers (e.g., Radio Network Temporary Identifiers ("RNTIs")), as assigned by components of a particular vRAN 103 to vUEs 101, may be mapped to IP addresses associated with vPHY components of the vUEs 101. Thus, when receiving traffic to be output to the particular vUE 101, a vPHY component of vRAN 103 may receive the traffic with the RAN-level identifier (e.g., a RNTI associated with vUE 101), and may simulate the wireless transmission of the traffic to vUE 101 by using the IP address associated with the vPHY component of the vUE 101 to send the traffic to a vPHY component of vUE 101.

Further, as discussed below, the maintaining of a mapping between RAN-level identifiers of vUEs 101 to the IP addresses of vPHY components of the vUES 101 may aid in situations where a handover is simulated (e.g., where vUE 101 connects to or identifies a second vRAN 103 after or while being connected to a first vRAN 103). For example, as discussed below, the second vRAN 103 may include a vPHY component that receives the mapping of the RAN-level identifier of vUE 101 to the IP address of the vPHY component of vUE 101, and uses the mapping to communicate with vUE 101 to facilitate a handover of vUE 101 to the second vRAN 103. For example, the vPHY component may use the IP address of the vPHY component of vUE 101 to simulate the communication of handover-related messaging between the second vRAN 103 and vUE 101.

The routing of traffic according to embodiments described herein may include providing system broadcast messages, such as System Information Blocks ("SIBs") or Master Information Blocks ("MIBs"), that are simulated as being broadcasted by vRANs 103, to vUEs 101 via connection-based messaging (e.g., unicast messaging, multicast messaging, etc.). Further, embodiments described herein may provide such simulated broadcast messages only to vUEs 101 that would receive such broadcasted messages in a live environment.

For example, as shown in FIG. 1, system broadcast messages from vRAN 103-1 may be provided to vUEs 101-1 and 101-2, based on the simulated location (e.g., simulated geographical location) of vUEs 101-1 and 101-2 being within a simulated coverage area 105-1 of vRAN 103-1. Simulated coverage area 105-1 may be, in some embodiments, a predetermined radius or distance from a simulated location associated with vRAN 103-1, and/or may be based on simulated RF conditions associated with vRAN 103-1 (e.g., where such simulated RF conditions may affect the coverage area of vRAN 103-1). As further shown here, the simulated system broadcast messages may not be provided to vUE 101-3, as the simulated location of vUE 101-3 is outside of simulated coverage area 105-1 associated with vRAN 103-1.

Similarly, system broadcast messages from vRAN 103-2 may be provided to vUE 101-2, and not to vUEs 101-1 and 101-3, as vUE 101-2 is within simulated coverage area 105-2 of vRAN 103-2 and vUEs 101-1 and 101-3 are outside of such simulated coverage area 105-2. As additionally shown, system broadcast messages from vRAN 103-3 may be provided to vUE 101-3, and not to vUEs 101-1 and 101-2, as vUE 101-3 is within simulated coverage area 105-3 of vRAN 103-3 and vUEs 101-1 and 101-2 are outside of such simulated coverage area 105-3. As further shown, no vUEs 101 may be present within simulated coverage area 105-4 associated with vRAN 103-4, and accordingly system broadcast messages associated with vRAN 103-4 may not be sent to any vUEs 101.

In this manner, RF signaling or traffic, including system broadcast messages associated with vRANs 103, may be sent using packet-based messaging (e.g., IP-based messaging). Further, as the simulated locations of vUEs 101 and vRANs 103 (and/or coverage areas 105) may be identified, embodiments described herein may simulate the broadcasting of RF traffic from vRANs 103 by sending such traffic to vUEs 101 within such coverage areas 105. In this manner, sending simulated broadcasted traffic only to vUEs 101 that are within relevant coverage areas 105 (i.e., not sending such traffic to vUEs 101 that are outside of relevant coverage areas 105) may conserve resources that may otherwise be consumed by broadcasting such simulated messages to all vUEs in virtual environment 100, and may further provide a more realistic simulation of a live environment.

While examples herein are described in the context of "system broadcast messages" such as MIBs, SIBs, etc., similar concepts may apply to any type of broadcast messages output from vRANs 103. For example, similar concepts may apply to broadcasts associated with a Multimedia Broadcast Service ("MBMS"), evolved MBMBS ("eMBMS"), or other type of broadcast technique.

Figure 2:
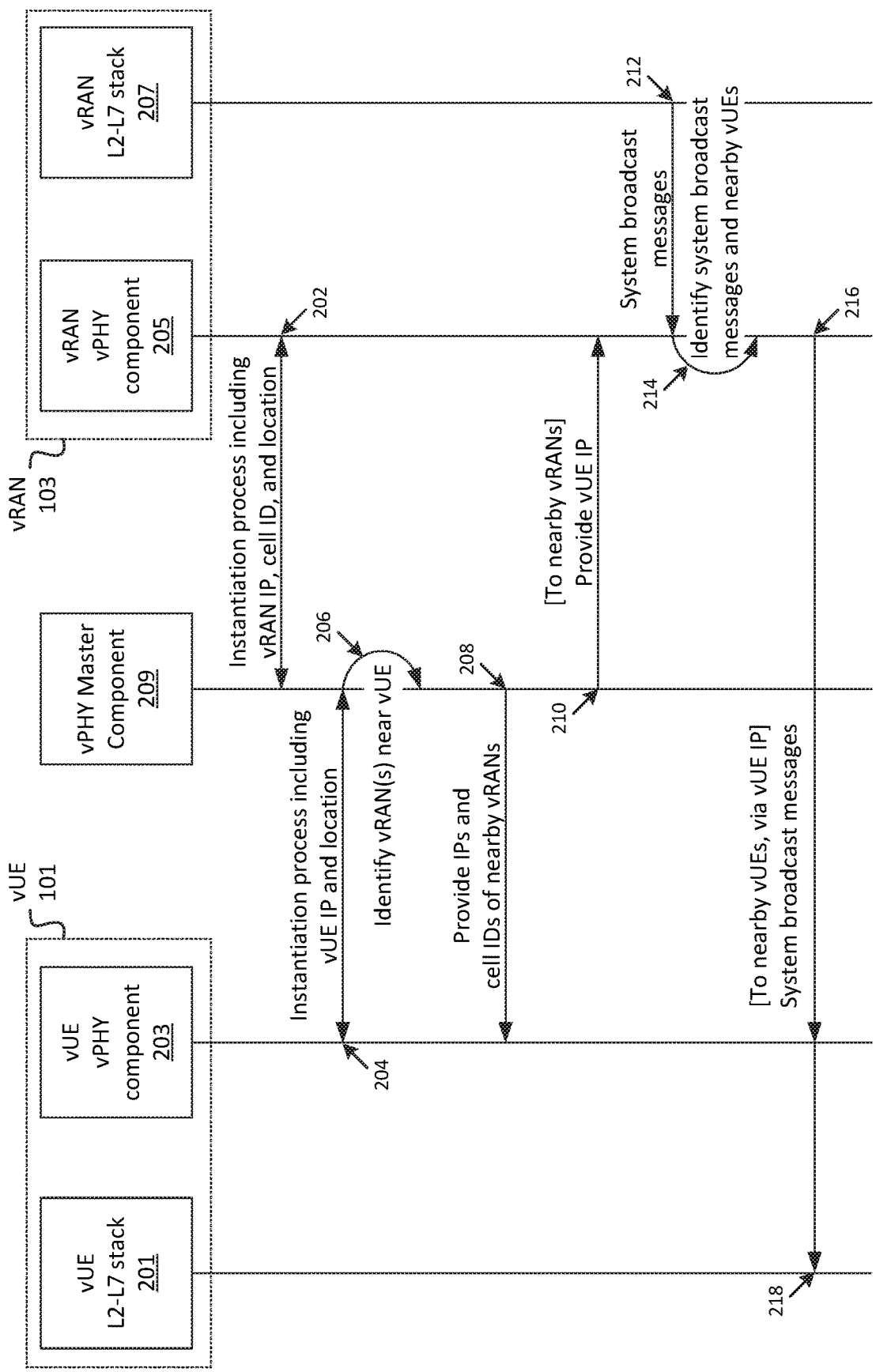
FIGS. 2-4 illustrates example signaling between vUEs, vRANs, and/or a virtual physical layer ("vPHY") master component of some embodiments in order to facilitate the simulation of radio frequency ("RF") communications in a virtual environment using packet-based communications.
Figure 3:
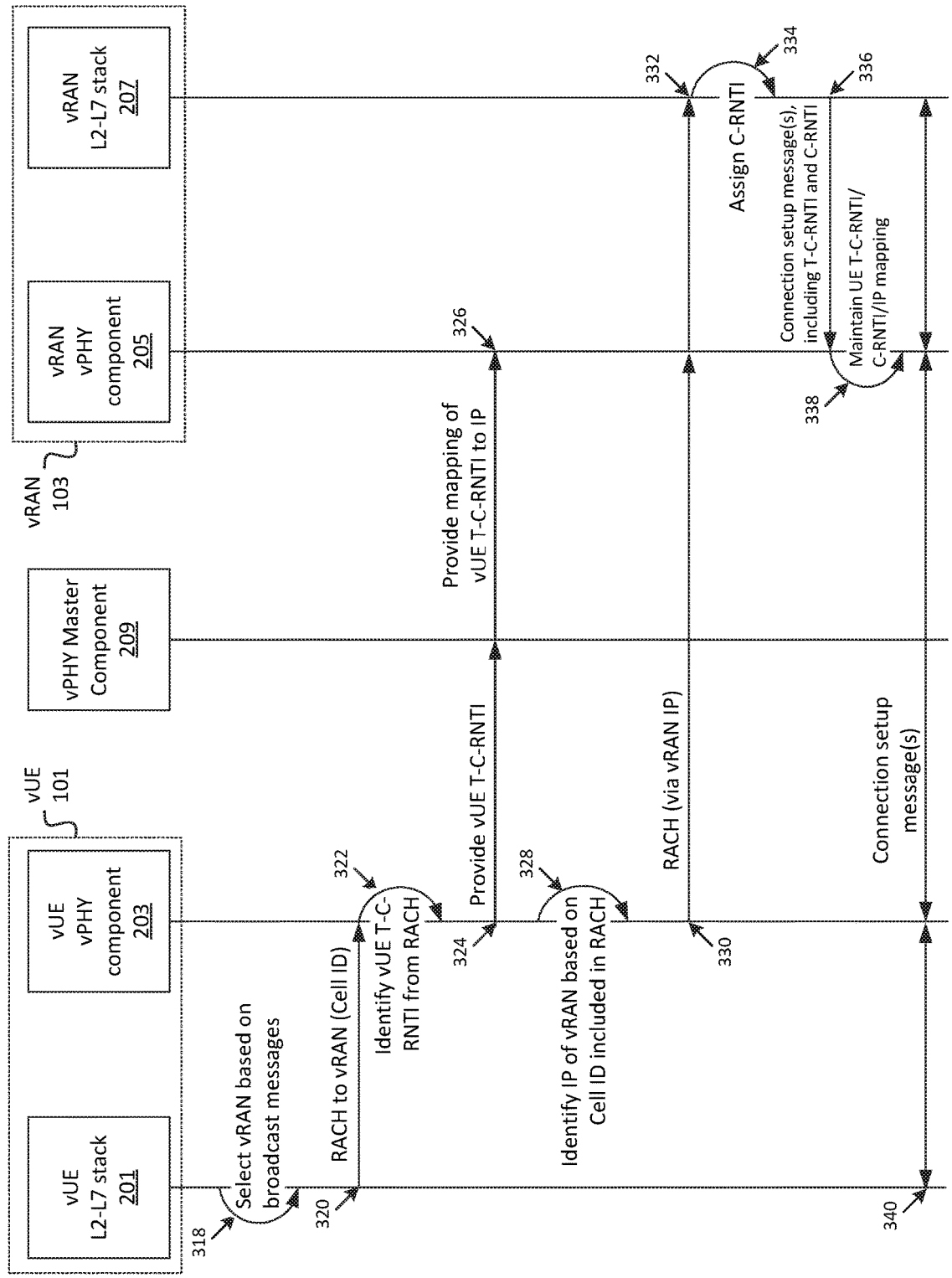
Figure 4:
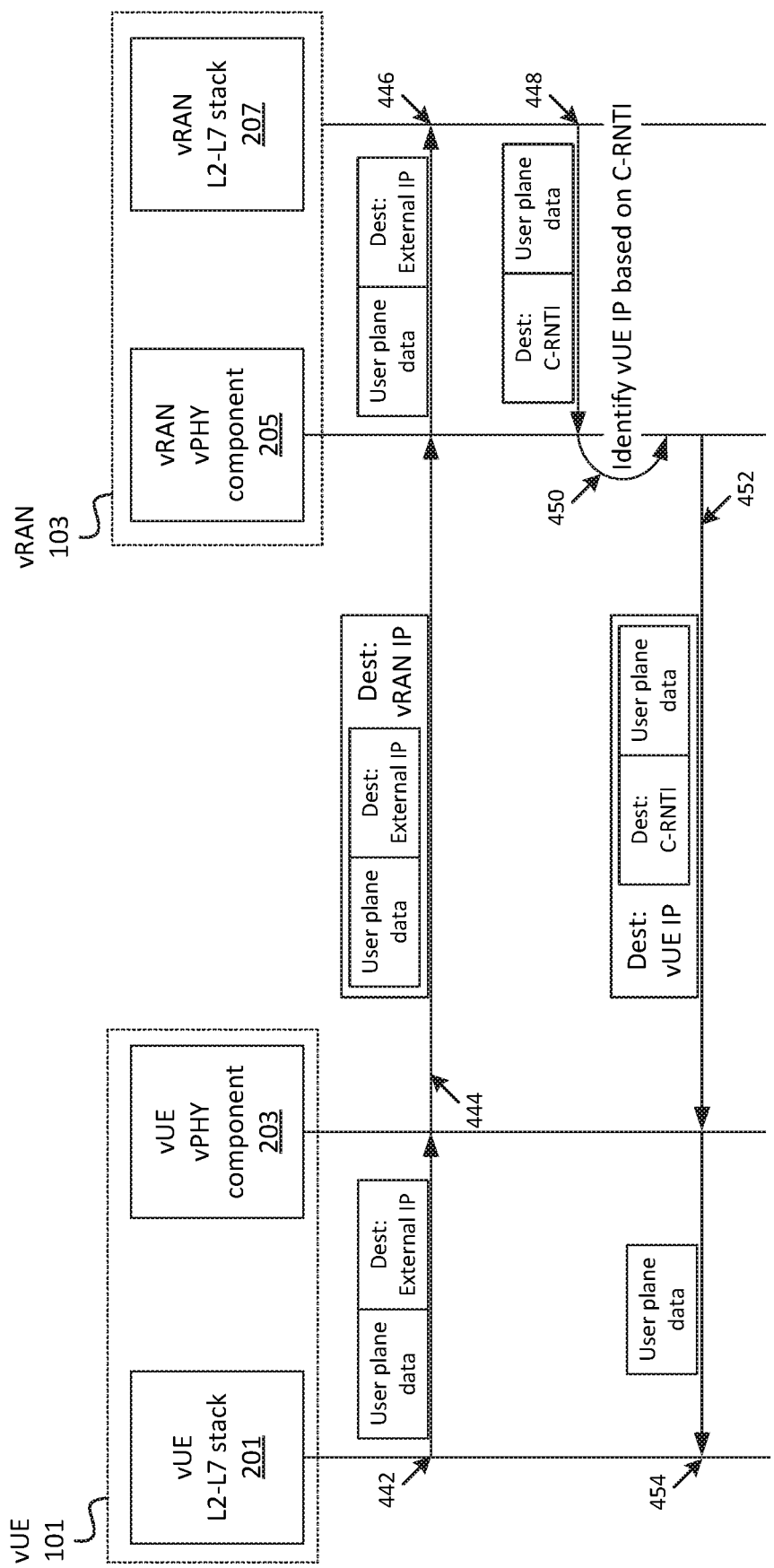

FIGS. 2-4 show example signaling by which a particular vUE 101 may establish a connection to a particular vRAN 103. For example, as shown, vUE 101 may include, implement, etc. a protocol stack. In the example described herein, the protocol stack may be a seven-layer model, where Layer 1 is a physical ("PHY") layer, and Layers 2-7 may correspond to "higher" layers of the stack. In practice, different models may be used (e.g., a protocol stack that uses additional or fewer layers than seven layers), but such models may still include a PHY layer or other similar type of layer associated with the sending and receiving of RF traffic. As noted above, for example, vUE 101 may be a containerized process, and/or may otherwise be a virtualized object that simulates a physical UE (e.g., a mobile phone, tablet pc, Internet of Things ("IoT") device, etc.). The protocol stack of layers of vUE 101, above the PHY layer, are represented herein as "L2-L7 stack" 201. Further, the PHY layer of vUE 101 may be simulated via vPHY component 203 (referred to herein as "vUE vPHY component 203" to differentiate from vRAN vPHY component 205 of vRAN 103). Thus, while vUE L2-L7 stack 201 may be identical to a protocol stack of real-world, physical UEs, vUE vPHY component 203 may replace or simulate a PHY layer that would otherwise be implemented (e.g., via radio transceiver circuitry and/or other suitable circuitry or logic) of real-world, physical UEs.

Similarly, vRAN 103 may include vRAN vPHY component 205, which may simulate a PHY layer of real-world, physical RANs. For example, vRAN vPHY component 205 may simulate radio transceiver circuitry and/or logic of a base station or other wireless component of a RAN associated with a wireless telecommunications network. Further, vRAN 103 may include vRAN L2-L7 stack 207, which may include the same or similar protocol stack as would be implemented by a real-world RAN.

As shown, vRAN vPHY component 205 may perform (at 202) an instantiation process. The instantiation process may include a creation, instantiation, reconfiguration, etc. of a container that implements vRAN L2-L7 stack 207 and/or vRAN vPHY component 205. vRAN vPHY component 205 may be associated with configurable parameters (e.g., via an application programming interface ("API") or other suitable technique), such as a simulated location of vRAN 103. Thus, in some embodiments, the instantiation process (at 202) may include a configuring or setting of the virtual location of vRAN 103. In some embodiments, vRAN vPHY component 205 may communicate (e.g., via an API, a routing technique, and/or some other suitable communication pathway) with vPHY master component 209. vPHY master component 209 may, in some embodiments, assign an IP address to vRAN vPHY component 205. For example, vPHY master component 209 may use Dynamic Host Configuration Protocol ("DHCP") or some other suitable technique to select, assign, etc. an IP address for vRAN vPHY component 205. In some embodiments, the instantiation process (at 202) may include vPHY master component 209 providing an IP address or other suitable address or identifier, associated with vPHY master component 209, to vRAN vPHY component 205. In some embodiments, vPHY master component 209 may assign the location associated with vRAN 103, and/or may receive the location from vRAN vPHY component 205 or from some other source.

While shown here in the context of one particular vRAN 103, in practice, the instantiation process (at 202) may be iteratively performed for multiple vRANs 103, such that multiple vRANs 103, each having their own location, may be instantiated. Further, the instantiation process (at 202) may include determining or assigning a respective coverage area 105 associated with each instantiated vRAN 103. For example, as discussed above, coverage area 105 for a particular vRAN 103 may be based on the simulated location of vRAN 103, such as a radius around a center point, a two-dimensional or three-dimensional polygon, etc. As also discussed above, vPHY master component 209 and/or some other device or system may simulate RF conditions associated with vRAN 103, based on which the respective coverage area 105 may be determined or modified. As further shown, vRAN vPHY component 205 may provide (at 202) a cell identifier ("ID") associated with vRAN 103. As discussed below, the cell ID may be included in RF messages simulated by vRAN 103 (e.g., by vRAN vPHY component 205).

A similar instantiation process may be performed (at 204) for vUE vPHY component 203, in which vPHY master component 209 assigns an IP address associated with vUE vPHY component 203 and receives or otherwise determines a simulated location associated with vUE 101. In some embodiments, the instantiation process (at 204) may include vPHY master component 209 providing an IP address or other suitable address or identifier, associated with vPHY master component 209, to vUE vPHY component 203.

Based on the locations and/or coverage area(s) 105 of vRAN(s) 103 and further based on the simulated location of vUE 101, vPHY master component 209 may identify (at 206) one or more vRANs 103 that have a coverage area 105 in which vUE 101 is located (referred to in the figure as "vRAN(s) near vUE"). Based on identifying (at 206) the "nearby" vRANs 103 (where "nearby" is used to refer to vRANs 103 having a coverage area 105 in which vUE 101 is located), vPHY master component 209 may provide (at 208) the IP addresses and cell IDs of the identified nearby vRANs 103 to vUE vPHY component 203. For example, vPHY master component 209 may use the information (received at 204) to identify that the IP address of vUE 101 is associated with a location that is within the coverage areas 105 of vRAN 103, and may communicate (at 208) with vUE 101 using the IP address of vUE 101. Additionally, vPHY master component 209 may provide (at 210), to the identified nearby vRANs 103, the IP address of vUE 101.

At some point, vRAN L2-L7 stack 207 may begin outputting (at 212) system broadcast messages, such as MIBs, SIBs, or the like. The system broadcast messages may include, among other information, a cell ID of vRAN 103. Additionally, or alternatively, vRAN L2-L7 stack 207 may instruct (at 212) vRAN vPHY component 205 to begin outputting system broadcast messages, which may be based on a simulated powering on of vRAN L2-L7 stack 207 or some other triggering event. vRAN vPHY component 205 may identify (at 214) system broadcast messages received from vRAN L2-L7 stack 207, and/or may generate (at 214) one or more system broadcast messages based on an instruction or trigger from vRAN L2-L7 stack 207. In accordance with some embodiments, vRAN vPHY component 205 may output (at 216) the system broadcast message to vUE vPHY component 203. For example, based on the IP address of vUE 101 (received at 210), vRAN vPHY component 205 may output (at 216) the system broadcast messages to vUE vPHY component 203 over a packet-based network using IP-based messaging. Additionally, vRAN vPHY component 205 may output (at 216) the system broadcast messages to any other vUEs 101 for which vRAN vPHY component 205 has received (e.g., similar to signal 210) IP addresses, indicating that such vUEs 101 are in coverage area 105 of vRAN 103.

vUE vPHY component 203 may provide (at 218) the received system broadcast messages to vUE L2-L7 stack 201. For example, vUE vPHY component 203 may remove an IP header and/or other header and/or encapsulation used by vRAN vPHY component 205 to communicate with vUE vPHY component 203, and provide the payload (e.g., system broadcast message itself) to vUE L2-L7 stack 201.

Once vUE L2-L7 stack 201 receives the system broadcast message, and as shown in FIG. 3, vUE L2-L7 stack 201 may select (at 318) a particular vRAN 103, to which vUE 101 should connect (e.g., simulate a connection). For example, in situations where vUE 101 (e.g., vUE vPHY component 203) receives system broadcast messages from multiple vRANs 103, vUE L2-L7 stack 201 may select (at 318) a particular one of the multiple vRANs 103. For example, as discussed below, vUE vPHY component 203 may receive (from vPHY master component 209) simulated RF conditions associated with vUE 101 and/or vRANs 103, based on which vUE vPHY component 203 may provide RF information associated with vUE 101 and/or vRANs 103 to vUE L2-L7 stack 201. For example, vUE 101 (e.g., vUE L2-L7 stack 201 and/or vUE vPHY component 203) may generate one or more measurement reports indicating signal quality or other metrics associated with RF conditions between vUE 101 and respective vRANs 103, and may select a particular vRAN 103 based on the measurement reports and/or other factors.

vUE L2-L7 stack 201 may output (at 320) a Random Access Channel ("RACH") message or other suitable message associated with establishing or requesting an RF connection (e.g., a simulated RF connection) between vUE 101 and vRAN 103. The RACH may include, among other suitable information, the cell ID of vRAN 103 (e.g., as included in the system broadcast message(s) received at 218). Additionally, or alternatively, vUE L2-L7 stack 201 may instruct (at 320) vUE vPHY component 203 to connect to vRAN 103 by indicating the cell ID of vRAN 103. The RACH may include an identifier of vUE 101, such as a Temporary Cell RNTI ("T-C-RNTI"), and/or some other suitable identifier of vUE 101 that uniquely differentiates vUE 101 from other vUEs 101.

vUE vPHY component 203 may identify (at 322) the T-C-RNTI from the RACH message, and/or may otherwise determine or identify (at 322) the T-C-RNTI associated with vUE 101. As further shown, vUE vPHY component 203 may provide (at 324) the T-C-RNTI of vUE 101 to vPHY master component 209. For example, vUE vPHY component 203 may use the IP address of vPHY master component 209 (e.g., as received at 204) to communicate with vPHY master component 209, may provide the T-C-RNTI via an API, and/or may otherwise provide the T-C-RNTI of vUE 101 to vPHY master component 209. vPHY master component 209 may, in turn, provide (at 326) a mapping of the T-C-RNTI and IP address of vUE 101 to vRAN vPHY component 205.

In some embodiments, in addition to, or in lieu of, providing (at 324) the T-C-RNTI to vPHY master component 209, vUE vPHY component 203 may provide the T-C-RNTI directly to vRAN vPHY component 205. For example, vUE vPHY component 203 may determine (at 328) the IP address of vRAN vPHY component 205 based on the received (at 320) cell ID of vRAN 103 and the received (at 208) information correlating the cell ID of vRAN 103 to the IP address associated with vRAN vPHY component 205, and may use such IP address to provide the T-C-RNTI of vUE 101 to vRAN vPHY component 205.

As further shown, vUE vPHY component 203 may output (at 330) the RACH (or other suitable connection establishment messages or requests) to vRAN vPHY component 205, using the identified IP address associated with vRAN vPHY component 205. vRAN vPHY component 205 may provide (at 332) the RACH to vRAN L2-L7 stack 207, and/or may otherwise indicate that a RACH or other type of message was received from vUE L2-L7 stack 201. For example, vRAN vPHY component 205 may remove IP header information and/or may otherwise decapsulate the received message from vUE vPHY component 203, such that the decapsulated message includes the RACH (or other suitable message) as provided by vUE L2-L7 stack 201 to vUE vPHY component 203.

As noted above, the RACH may include the T-C-RNTI of vUE 101. vRAN L2-L7 stack 207 may assign (at 334) a C-RNTI to vUE 101, which may be used by vRAN 103 to uniquely identify vUE 101 from other vUEs connected to vRAN 103. Additionally, or alternatively, vRAN L2-L7 stack 207 may instruct vRAN vPHY component 205 to generate or assign a C-RNTI to vUE 101. vRAN L2-L7 stack 207 may further output (at 336) one or more connection setup messages, including the T-C-RNTI and the C-RNTI assigned to vUE 101, and/or vRAN L2-L7 stack 207 may instruct vRAN vPHY component 205 to generate or output such messages. The particular messages used for connection establishment are not discussed in detail here, for the sake of brevity.

vRAN vPHY component 205 may identify (at 338) the connection establishment message(s) from vRAN L2-L7 stack 207 based on header information and/or other suitable information, indicating that the messages are connection establishment messages. In some embodiments, vRAN vPHY component 205 may identify the connection establishment messages based on determining that the messages are associated with a particular control channel (e.g., a simulated RF control channel), such as a Physical Uplink Shared Channel ("PUSCH"), a Physical Uplink Control Channel ("PUCCH"), or some other particular channel. In some embodiments, vRAN vPHY component 205 may identify that the connection establishment messages include the T-C-RNTI of vUE 101, as well as a C-RNTI (e.g., the C-RNTI assigned by vRAN L2-L7 stack 207). vRAN vPHY component 205 may accordingly maintain (at 338) information associating the IP address of vUE vPHY component 203 to the T-C-RNTI and the C-RNTI of vUE 101.

In some embodiments, vUE 101 and vRAN 103 may utilize one or more additional messages to simulate (at 340) the establishment of a connection between vUE 101 and vRAN 103. As similarly discussed above, vUE vPHY component 203 may output such messages to the IP address associated with vRAN vPHY component 205, and vRAN vPHY component 205 may output such messages to the IP address associated with vUE vPHY component 203.

In some embodiments, while not discussed in detail here, the connection setup may include the assignment of an IP address for vUE 101 (e.g., for vUE L2-L7 stack 201). For example, a core network (or a simulated core network) may assign an IP address for vUE 101. Such IP address may be assigned by, for example, a Serving Gateway ("SGW"), a Session Management Function ("SMF"), and/or some other suitable device or system. This IP address may be different from, and independent from, the IP address associated with vUE vPHY component 203. That is, while vUE vPHY component 203, vRAN vPHY component 205, and vPHY master component 209 may communicate with each other using one set of IP addresses, these IP addresses may be "out of band" as compared to an IP address logically associated with vUE 101 and used by a core network or other system to communicate with vUE 101. In other words, "user plane data" may be sent to and/or received from vUE 101 using this network-assigned IP address, while the IP address associated with vUE vPHY component 203 may be used to simulate the physical transmission of PHY-layer data between vRAN vPHY component 205 and vUE vPHY component 203.

For example, as shown in FIG. 4, in the uplink direction, vUE L2-L7 stack 201 may generate and output (at 442) user plane data, to be provided to a particular destination via vRAN 103 and a packet-based data network to which vRAN 103 is communicatively coupled. The user plane data may be included in an IP packet, indicating an IP address of the intended destination (referred to as "External IP"). The term "External IP" is used here to differentiate IP addresses for user plane data, as sent and/or received by vUE L2-L7 stack 201, from the IP addresses discussed above which are used by vUE vPHY component 203, vRAN vPHY component 205, and vPHY master component 209 to simulate physical communications between vUE vPHY component 203 and vRAN vPHY component 205.

vUE vPHY component 203 may receive the user plane data from vUE L2-L7 stack 201, and may encapsulate the user plane data in a packet (e.g., an IP packet) that is destined for vRAN vPHY component 205. vUE vPHY component 203 may accordingly output (at 444) the encapsulated user plane data, including the originally indicated External IP of the recipient as indicated by vUE L2-L7 stack 201. Although not explicitly shown in the figure for the purpose of clarity, vUE vPHY component 203 may encapsulate the user plane data in one or more other levels of encapsulation, including adding the C-RNTI of vUE 101 before ultimately encapsulating the data for transmission to vRAN vPHY component 205 using the IP address of vRAN vPHY component 205.

vRAN vPHY component 205 may receive the encapsulated user plane data, may remove the header information (e.g., indicating the IP address of vRAN vPHY component 205) and/or other suitable encapsulation of the user plane data (e.g., header information including the C-RNTI of vUE 101), and may provide (at 446) the user plane data to vRAN L2-L7 stack 207. vRAN L2-L7 stack 207 may process the user plane data accordingly, which may include forwarding the user plane data to one or more external devices or systems, such as a router, network, etc. that forwards the user plane data towards the intended destination, as indicated by the External IP address.

In the downlink direction, vRAN L2-L7 stack 207 may receive user plane data for vUE 101. For example, vRAN L2-L7 stack 207 may receive (or may simulate the receipt of) user plane data from a device or system that communicates with vRAN L2-L7 stack 207 via a packet-based network. The received user plane data may include header information including the external IP address of vUE 101, based on which vRAN L2-L7 stack 207 may identify the C-RNTI of vUE 101. vRAN L2-L7 stack 207 may provide (at 448) the user plane data to vRAN vPHY component 205 for transmission to vUE 101. For example, vRAN L2-L7 stack 207 may add header information including the C-RNTI of vUE 101 and/or may otherwise encapsulate the user plane data in a packet that includes the C-RNTI of vUE 101.

vRAN vPHY component 205 may identify (at 450) the IP address of vUE vPHY component 203 based on the C-RNTI, and may output (at 452) the encapsulated user plane data to vUE vPHY component 203 using the identified IP address of vUE vPHY component 203. vUE vPHY component 203 may decapsulate the IP address of vUE vPHY component 203 and/or the C-RNTI, and may provide (at 454) the user plane data to vUE L2-L7 stack 201. In some embodiments, alternatively, vUE vPHY component 203 may decapsulate the IP address of vUE vPHY component 203 and may provide the user plane data to vUE L2-L7 stack 201 along with the C-RNTI of vUE 101, and vUE L2-L7 stack 201 may process the user plane data accordingly.

While the example of FIG. 4 is discussed in the context of "user plane data," in practice, similar concepts may apply for any type of traffic, data, signaling, etc. sent between vUE 101 and vRAN 103. Specifically, for example, vRAN vPHY component 205 may identify the IP address of vUE vPHY component 203 based on a C-RNTI or other suitable identifier of vUE 101 for downlink data (e.g., data to be sent to vUE 101), and may send such traffic, data, signaling, etc. to vUE vPHY component 203 using the IP address of vUE vPHY component 203. For uplink data (e.g., data to be sent from vUE 101), vUE vPHY component 203 may send such data to vRAN vPHY component 205 using the IP address of vRAN vPHY component 205 (e.g., as identified at 328) after selection of vRAN 103 to serve vUE 101.

Figure 5:
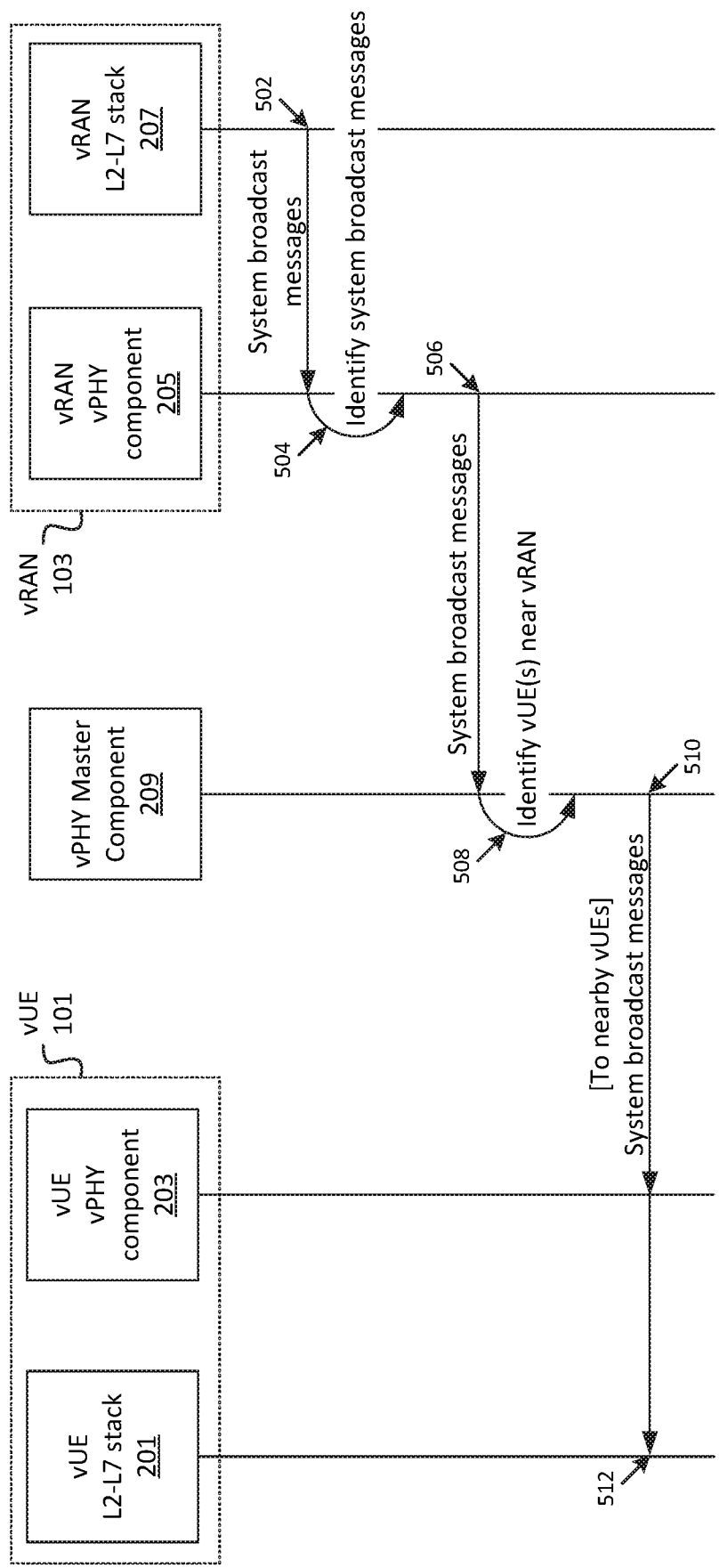
FIG. 5 illustrates example signaling to simulate the broadcasting of RF signals by a vRAN, in accordance with some embodiments.

FIG. 5 illustrates an example of providing system broadcast messages from vRAN 103 to one or more vUEs 101 that are in a coverage area 105 associated with vRAN 103. In some embodiments, signals 502-512 may be an alternative to signals 212-218 shown in FIG. 2, or may be used in conjunction with signals 212-218. As shown, for example, vRAN L2-L7 stack 207 may output (at 502) one or more system broadcast messages, such as one or more SIBs, MIBs, etc. vRAN vPHY component 205 may identify (at 504) the system broadcast messages by identifying header information, a channel associated with the system broadcast messages (e.g., a control channel), and/or may otherwise identify that the messages received from vRAN L2-L7 stack 207 are system broadcast messages.

vRAN vPHY component 205 may accordingly output (at 506) the system broadcast messages to vPHY master component 209 using an IP address of 209, an API implemented by vRAN vPHY component 205 and/or vPHY master component 209, and/or some other suitable communication pathway. In some embodiments, vRAN vPHY component 205 may include header information and/or some other indicator that the data being sent (at 504) includes system broadcast messages. As noted above, similar concepts may apply to other types of broadcast messages, such as messages associated with a MBMS or eMBMS technique. In such situations, vRAN vPHY component 205 may similarly indicate (at 506) that the messages are broadcast messages to be broadcasted to vUEs 101 within a coverage area of vRAN 103.

Based on receiving (at 506) the broadcast message(s) from vRAN vPHY component 205, vPHY master component 209 may identify (at 508) vUEs 101 that within the coverage area of vRAN 103. For example, as discussed above, vPHY master component 209 may make the determination based on a location of vRAN 103, a location of vUEs 101, and/or simulated RF conditions associated with vRAN 103 and/or vUEs 101. vPHY master component 209 may accordingly output (at 510) the broadcast message(s) to the identified "nearby" (e.g., within coverage area 105) vUEs 103, using the IP addresses of vUEs 103 (e.g., as received or assigned during instantiation process 204). vUE vPHY component 203 may accordingly provide (at 512) the received broadcast message(s), which may include removing IP header information used by vPHY master component 209 to send the message(s) to vUE vPHY component 203.

Figure 6:
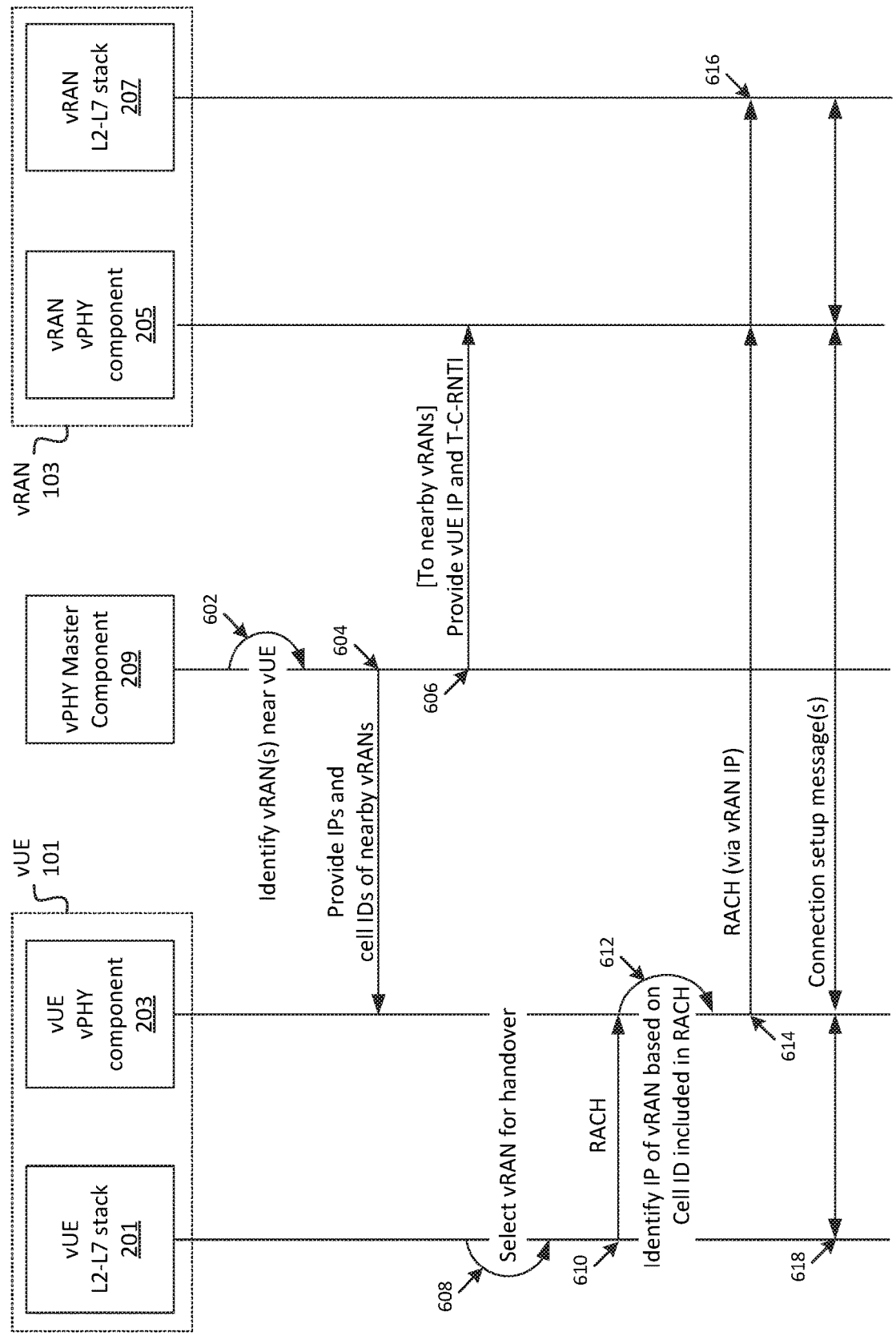
FIG. 6 illustrates example signaling to simulate the handover of a vUE from one vRAN to another, in accordance with some embodiments.

As shown in FIG. 6, the mapping of RAN identifiers (e.g., T-C-RNTI and/or C-RNTI) of vUE 101 may be used by vPHY master component 209 to facilitate a simulated handover of vUE 101 from one vRAN 103 to another. Assume that vRAN 103, shown in FIG. 6, is a vRAN to which vUE 101 is handed over (e.g., from another vRAN). As shown, vPHY master component 209 may identify (at 602) one or more vRANs 103 near vUE 101. For example, vPHY master component 209 and/or vUE 101 may simulate location information indicating that vUE 101 is moving into coverage area 105 of vRAN 103, and/or that RF conditions associated with vUE 101 and/or vRAN 103 have changed such that vUE 101 has come within the coverage area 105 of vRAN 103.

vPHY master component 209 may provide (at 604) cell IDs and IP addresses of the identified vRANs to vUE vPHY component 203, as similarly described above with respect to signal 208. Additionally, vPHY master component 209 may provide (at 606) the IP address of vUE vPHY component 203 to the identified nearby vRAN(s), including vRAN 103 shown in FIG. 6. vPHY master component 209 may also, in some embodiments, provide (at 606) the IP address of vUE 101 to vRAN vPHY component 205, based on identifying that vUE 101 is within coverage area 105 associated with vRAN 103.

As further shown, vUE L2-L7 stack 201 may select (at 608) vRAN 103 for handover, which may be based on simulated RF conditions, simulated locations of vUE 101 and vRAN 103, and/or other factors. vUE L2-L7 stack 201 may output (at 610) a RACH or other type of message to initiate the handover, and vUE vPHY component 203 may identify (at 612) the IP address of vRAN 103 based on a Cell ID included in the RACH (e.g., as similarly described above with respect to signals 320 and 328). vUE vPHY component 203 may proceed to output (at 614) the RACH to vRAN vPHY component 205, which may remove IP header information used by vUE vPHY component 203 to provide the RACH as a payload to vRAN vPHY component 205, and may provide (at 616) the RACH to vRAN L2-L7 stack 207. vUE 101 and vRAN 103 may proceed to communicate (at 618) one or more messages with each other to completed the handover. As similarly discussed above (e.g., at 336-340), vUE vPHY component 203 may output messages to vRAN 103 by using the IP address of vRAN vPHY component 205, and vRAN L2-L7 stack 207 may output messages, destined to a T-C-RNTI and/or C-RNTI of vUE 101, to vRAN vPHY component 205 using the IP address of vRAN vPHY component 205.

Figure 7:
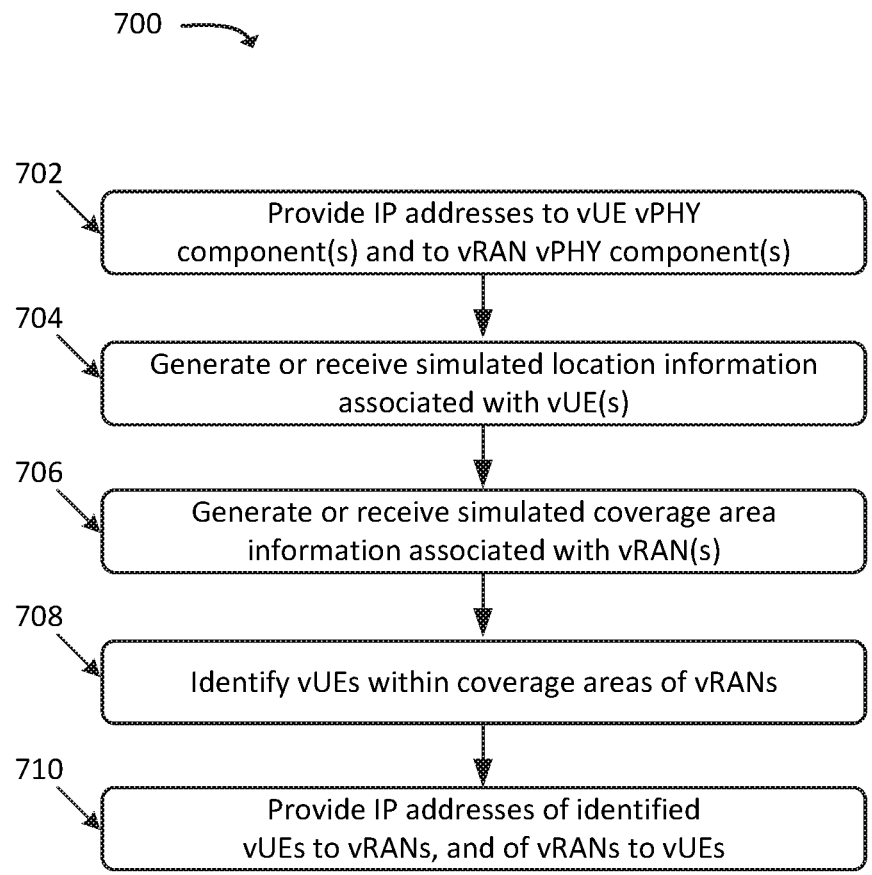
FIG. 7 illustrates an example process for facilitating simulated RF communications between one or more vUEs and one or more vRANs, in accordance with some embodiments.

FIG. 7 illustrates an example process 700 for facilitating simulated RF communications between one or more vUEs 101 and one or more vRANs 103. In some embodiments, some or all of process 700 may be performed by vPHY master component 209. In some embodiments, one or more other devices may perform some or all of process 700 in concert with, and/or in lieu of, vPHY master component 209.

As shown, process 700 may include providing (at 702) IP addresses to one or more vUE vPHY components 203 and/or vRAN vPHY components 205. For example, as discussed above, vPHY master component 209 may use DHCP or some other suitable technique to generate, select, provide, etc. IP addresses for vUE vPHY components 203 and/or vRAN vPHY components 205. Such providing may be, for example, part of a provisioning, re-provisioning, instantiation, configuration, re-configuration, etc. process of vUEs 101 and/or vRANs 103.

Process 700 may further include generating and/or receiving (at 704) simulated location information associated with vUEs 101. For example, vPHY master component 209 may generate simulated location information associated with vUEs 101, may receive simulated location information from vPHY components 203 associated with vUEs 101, and/or may receive simulated location information from some other device or system.

Process 700 may additionally include generating and/or receiving (at 706) simulated coverage area information associated with vRANs 103. For example, vPHY master component 209 may generate simulated RF channel condition information associated with vRANs 103, may receive simulated RF channel condition information from vPHY components 205 associated with vRANs 103, and/or may receive simulated RF channel condition information from some other device or system. In some embodiments, vPHY master component 209 may generate and/or receive location information associated with vRANs 103. Based on the simulated RF channel condition information, the received simulated location information, and/or one or more other factors, vPHY master component 209 may determine a coverage area 105 associated with respective vRANs 103.

Process 700 may also include identifying (at 708) vUEs 101 that are within a coverage area of one or more vRANs 103. For example, based on the simulated location information of vUEs 101 and the coverage area 105 of vRANs 103, vPHY master component 209 may determine which vUEs 101 are within the coverage areas 105 of which vRANs 103.

Process 700 may further include providing (at 710) IP addresses of the identified vUEs 101 to the identified vRANs 103, and of the identified vRANs 103 to the identified vUEs 101. In this manner, vUEs 101 that are within respective coverage areas of vRANs 103 may be able to simulate RF communications with such vRANs 103 using the IP addresses of respective vRAN vPHY components 205, and vRANs 103 may be able to simulate RF communications with "nearby" vUEs 101 using the IP addresses of respective vUE vPHY components 203.

Figure 8:
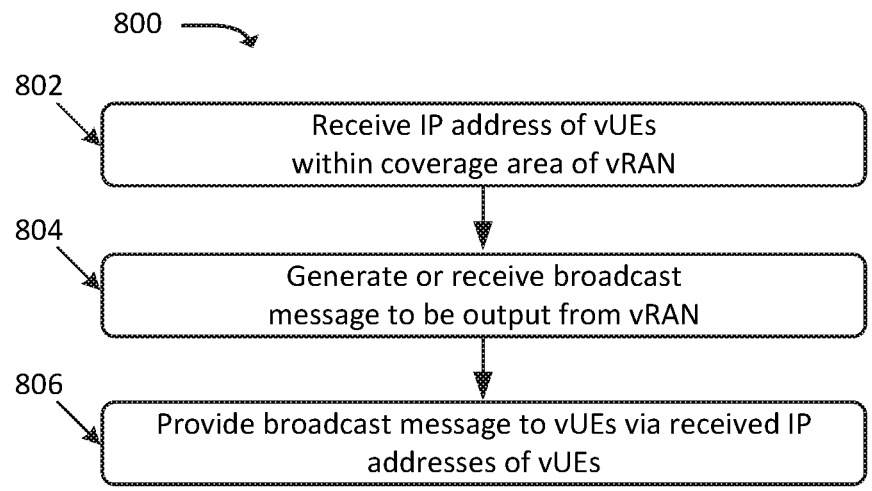
FIG. 8 illustrates an example process for simulating the RF broadcast of messages to vUEs within communications range of a particular vRAN, in accordance with some embodiments.

FIG. 8 illustrates an example process 800 for simulating the RF broadcast of messages to vUEs 101 within communications range of a particular vRAN 103. In some embodiments, some or all of process 800 may be performed by vRAN 103 (e.g., by vRAN vPHY component 205 associated with vRAN 103). In some embodiments, one or more other devices may perform some or all of process 800 in concert with, and/or in lieu of, vRAN 103.

As shown, process 800 may include receiving (at 802) IP addresses associated with vUEs 101 within a coverage area of vRAN 103. For example, as discussed above, vRAN vPHY component 205 may receive IP addresses of vUE vPHY components 203 associated with respective vUEs 101 within coverage area 105 of vRAN 103 from vPHY master component 209 and/or from some other source.

Process 800 may further include generating and/or receiving (at 804) a broadcast message to be output from vRAN 103. For example, vRAN L2-L7 stack 207 of vRAN 103 may provide, to vRAN vPHY component 205, a system broadcast message, a message to be broadcasted via MBMS or eMBMS, and/or a message that is to be otherwise broadcasted from vRAN 103.

Process 800 may additionally include providing (at 806) the broadcast message to vUEs 101 via the IP addresses (received at 802) associated with the vUE vPHY components 203 of vUEs 101 that are within coverage area 105 associated with vRAN 103.

Figure 9:
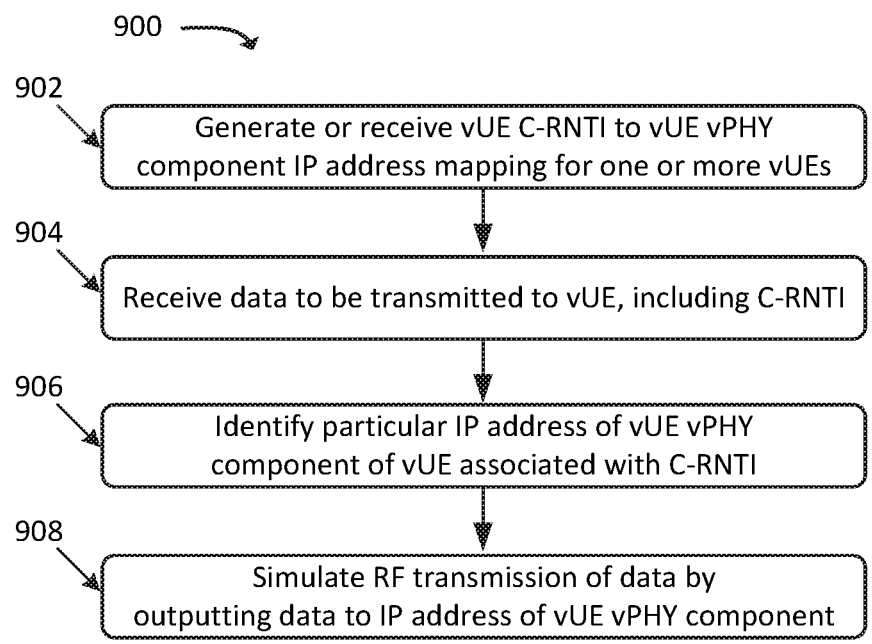
FIG. 9 illustrates an example process for outputting data to a particular vUE.

FIG. 9 illustrates an example process 900 for outputting data to a particular vUE 101. In some embodiments, some or all of process 900 may be performed by vRAN 103 (e.g., by vRAN vPHY component 205 associated with vRAN 103). In some embodiments, one or more other devices may perform some or all of process 900 in concert with, and/or in lieu of, vRAN 103.

As shown, process 900 may include generating and/or receiving (at 902) a mapping of a C-RNTI of vUE 101 to an IP address of a particular vUE vPHY component 203 associated with vUE 101. For example, as discussed above, vRAN vPHY component 205 may receive or determine such mapping information based on receiving a mapping of a T-C-RNTI (e.g., from vPHY master component 209) associated with vUE 101 to an IP address of vUE vPHY component 203, and may also receive (e.g., from vRAN L2-L7 stack 207) information that correlates the T-C-RNTI of vUE 101 to a C-RNTI of vUE 101. In this manner, vUE vPHY component 203 may determine a mapping between the C-RNTI of vUE 101 to the IP address of vUE vPHY component 203 associated with vUE 101.

Process 900 may further include receiving (at 904) data to be transmitted to vUE 101. The data may be received from vRAN L2-L7 stack 207, and may include a C-RNTI of vUE 101. Process 900 may additionally include identifying (at 906) an IP address of vRAN 103, associated with vUE 101, based on the mapping between the C-RNTI of vUE 101 to the IP address of vRAN 103. vRAN 103 (e.g., vRAN vPHY component 205) may accordingly simulate (at 908) the RF transmission of the data to vUE 101 by providing the data to vUE vPHY component 203 of vUE 101.

Figure 10:
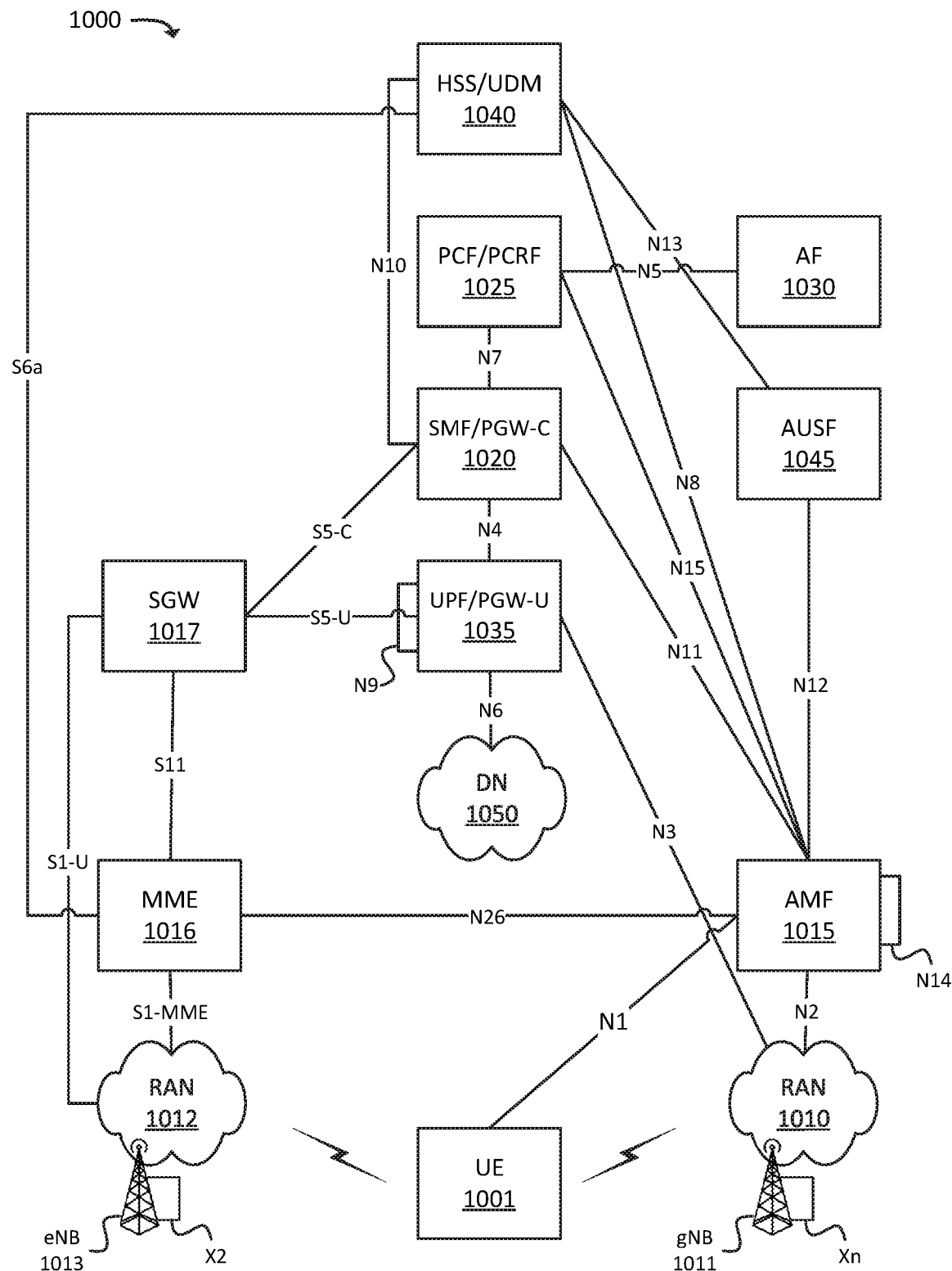
FIG. 10 illustrates an example environment in which one or more embodiments, described herein, may be implemented.

FIG. 10 illustrates an example environment 1000, in which one or more embodiments may be implemented. Specifically, for example, as discussed below, vRAN 103 may implement and/or simulate RAN 1010, RAN 1012, one or more different types of RANs, and/or one or more components thereof.

In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1001, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, SGW 1017, SMF/Packet Data Network ("PDN") Gateway ("PGW")-Control plane function ("PGW-C") 1020, Policy Control Function ("PCF")/Policy Charging and Rules Function ("PCRF") 1025, Applications Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1001 may include a computation and communication device, such as a wireless mobile communication device that is capable of communicating with RAN 1010, RAN 1012, and/or DN 1050. UE 1001 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1001 may send traffic to and/or receive traffic (e.g., user plane traffic) from DN 1050 via RAN 1010, RAN 1012, and/or UPF/PGW-U 1035. vUE 101 may simulate the operation of UE 1001, including the operations and/or techniques described above with respect to FIGS. 1-9.

RAN 1010 may be, or may include, a 5G RAN that includes one or more base stations (e.g., one or more gNBs 1011), via which UE 1001 may communicate with one or more other elements of environment 1000. UE 1001 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, AMF 1015, and/or one or more other devices or networks) and may communicate the traffic to UE 1001 via the air interface.

RAN 1012 may be, or may include, a LTE RAN that includes one or more base stations (e.g., one or more eNBs 1013), via which UE 1001 may communicate with one or more other elements of environment 1000. UE 1001 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1001 via the air interface, and may communicate the traffic to UPF/PGW-U 1035, and/or one or more other devices or networks. Similarly, RAN 1010 may receive traffic intended for UE 1001 (e.g., from UPF/PGW-U 1035, SGW 1017, and/or one or more other devices or networks) and may communicate the traffic to UE 1001 via the air interface.

vRAN 103 may simulate the operation of RAN 1010, RAN 1012, gNB 1011, and/or eNB 1013 including the operations and/or techniques described above with respect to FIGS. 1-9. For example, the "air interface" referred to above, between RANs 1010 and 1012, and UE 1001, may be simulated by way of packet-based communications between one or more instances of vUE vPHY component 203, associated with vUE 101, and vRAN vPHY component 205, associated with vRAN 103.

AMF 1015 may include one or more devices, systems, Virtualized Network Functions ("VNFs"), etc., that perform operations to register UE 1001 with the 5G network, to establish bearer channels associated with a session with UE 1001, to hand off UE 1001 from the 5G network to another network, to hand off UE 1001 from the other network to the 5G network, manage mobility of UE 1001 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1001 with the EPC, to establish bearer channels associated with a session with UE 1001, to hand off UE 1001 from the EPC to another network, to hand off UE 1001 from another network to the EPC, manage mobility of UE 1001 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1001. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1001, from DN 1050, and may forward the user plane data toward UE 1001 (e.g., via RAN 1010, SMF/PGW-C 1020, and/or one or more other devices). In some embodiments, multiple UPFs 1035 may be deployed (e.g., in different geographical locations), and the delivery of content to UE 1001 may be coordinated via the N9 interface (e.g., as denoted in FIG. 10 by the line marked "N9" originating and terminating at UPF/PGW-U 1035). Similarly, UPF/PGW-U 1035 may receive traffic from UE 1001 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1001.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1001 may communicate, through DN 1050, with data servers, other UEs 1001, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1001 may communicate.

Figure 11:
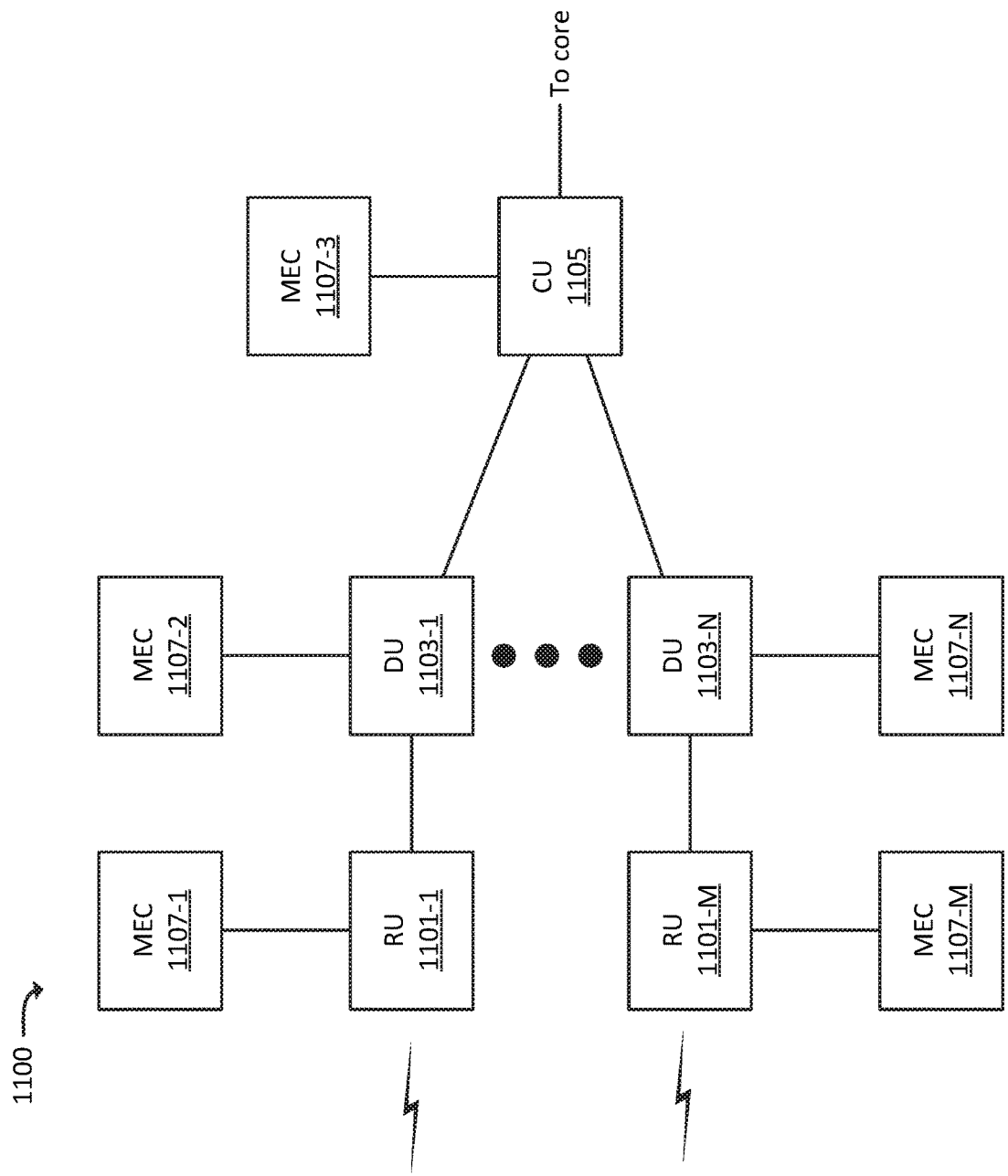
FIG. 11 illustrates an example arrangement of a RAN, in accordance with some embodiments.

FIG. 11 illustrates an example Distributed Unit ("DU") network 1100, which may be included in and/or implemented by one or more RANs (e.g., RAN 1010). Thus, in some embodiments, vRAN 103 may include, may implement, may simulate, etc. DU network 1100 and/or one or more components of DU network 1100 described below.

In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 1001 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1001, and may determine which DU(s) 1103 should receive the downlink traffic. DU 1103 may include one or more devices that transmit traffic between a core network (e.g., via CU 1105) and UE 1001 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1001.

RU 1101 may include hardware circuitry (e.g., one or more RF transceivers, antennas, radios, and/or other suitable hardware) to communicate wirelessly (e.g., via an RF interface) with one or more UEs 1001, one or more other DUs 1103 (e.g., via RUs 1101 associated with DUs 1103), and/or any other suitable type of device. In the uplink direction, RU 1101 may receive traffic from UE 1001 and/or another DU 1103 via the RF interface and may provide the traffic to DU 1103. In the downlink direction, RU 1101 may receive traffic from DU 1103, and may provide the traffic to UE 1001 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1001, via a respective RU 1101.

For example, RU 1101-1 may route some traffic, from UE 1001, to MEC 1107-1 instead of to a core network (e.g., via DU 1103 and CU 1105). MEC 1107-1 may process the traffic, perform one or more computations based on the received traffic, and may provide traffic to UE 1001 via RU 1101-1. In this manner, ultra-low latency services may be provided to UE 1001, as traffic does not need to traverse DU 1103, CU 1105, and an intervening backhaul network between DU network 1100 and the core network.

Figure 12:
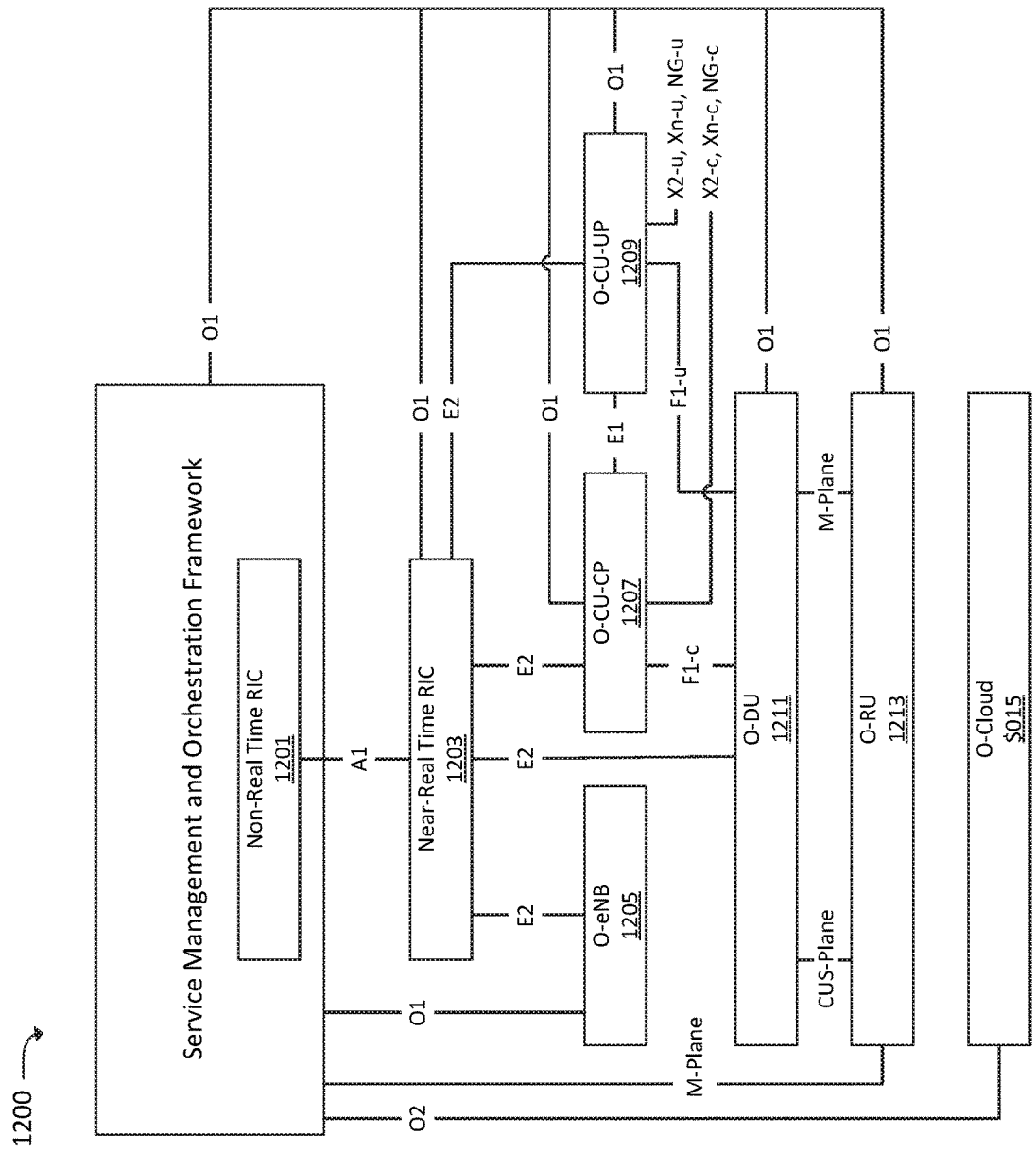
FIG. 12 illustrates an example arrangement of an Open RAN ("O-RAN") environment in which one or more embodiments, described herein, may be implemented.

FIG. 12 illustrates an example O-RAN environment 1200, which may correspond to RAN 1010, RAN 1012, and/or DU network 1100. For example, RAN 1010, RAN 1012, and/or DU network 1100 may include one or more instances of O-RAN environment 1200, and/or one or more instances of O-RAN environment 1200 may implement RAN 1010, RAN 1012, DU network 1100, and/or some portion thereof. As also similarly discussed above, vRAN 103 may implement, simulate, etc. O-RAN environment 1200 and/or one or more components of O-RAN environment 1200 described below.

As shown, O-RAN environment 1200 may include Non-Real Time Radio Intelligent Controller ("RIC") 1201, Near-Real Time RIC 1203, O-eNB 1205, O-CU-Control Plane ("O-CU-CP") 1207, O-CU-User Plane ("O-CU-UP") 1209, O-DU 1211, O-RU 1213, and O-Cloud 1215. In some embodiments, O-RAN environment 1200 may include additional, fewer, different, and/or differently arranged components.

In some embodiments, some or all of the elements of O-RAN environment 1200 may be implemented by one or more configurable or provisionable resources, such as virtual machines, cloud computing systems, physical servers, and/or other types of configurable or provisionable resources. In some embodiments, some or all of O-RAN environment 1200 may be implemented by, and/or communicatively coupled to, one or more MECs 1107.

Non-Real Time RIC 1201 and Near-Real Time RIC 1203 may receive performance information (and/or other types of information) from one or more sources, and may configure other elements of O-RAN environment 1200 based on such performance or other information. For example, Near-Real Time RIC 1203 may receive performance information, via one or more E2 interfaces, from O-eNB 1205, O-CU-CP 1207, and/or O-CU-UP 1209, and may modify parameters associated with O-eNB 1205, O-CU-CP 1207, and/or O-CU-UP 1209 based on such performance information. Similarly, Non-Real Time RIC 1201 may receive performance information associated with O-eNB 1205, O-CU-CP 1207, O-CU-UP 1209, and/or one or more other elements of O-RAN environment 1200 and may utilize machine learning and/or other higher level computing or processing to determine modifications to the configuration of O-eNB 1205, O-CU-CP 1207, O-CU-UP 1209, and/or other elements of O-RAN environment 1200. In some embodiments, Non-Real Time RIC 1201 may generate machine learning models based on performance information associated with O-RAN environment 1200 or other sources, and may provide such models to Near-Real Time RIC 1203 for implementation.

O-eNB 1205 may perform functions similar to those described above with respect to eNB 1013. For example, O-eNB 1205 may facilitate wireless communications between 1001 and a core network. O-CU-CP 1207 may perform control plane signaling to coordinate the aggregation and/or distribution of traffic via one or more DUs 1103, which may include and/or be implemented by one or more O-DUs 1211, and O-CU-UP 1209 may perform the aggregation and/or distribution of traffic via such DUs 1103 (e.g., O-DUs 1211). O-DU 1211 may be communicatively coupled to one or more RUs 1101, which may include and/or may be implemented by one or more O-RUs 1213. In some embodiments, O-Cloud 1215 may include or be implemented by one or more MECs 1107, which may provide services, and may be communicatively coupled, to O-CU-CP 1207, O-CU-UP 1209, O-DU 1211, and/or O-RU 1213 (e.g., via an O1 and/or O2 interface).

Figure 13:
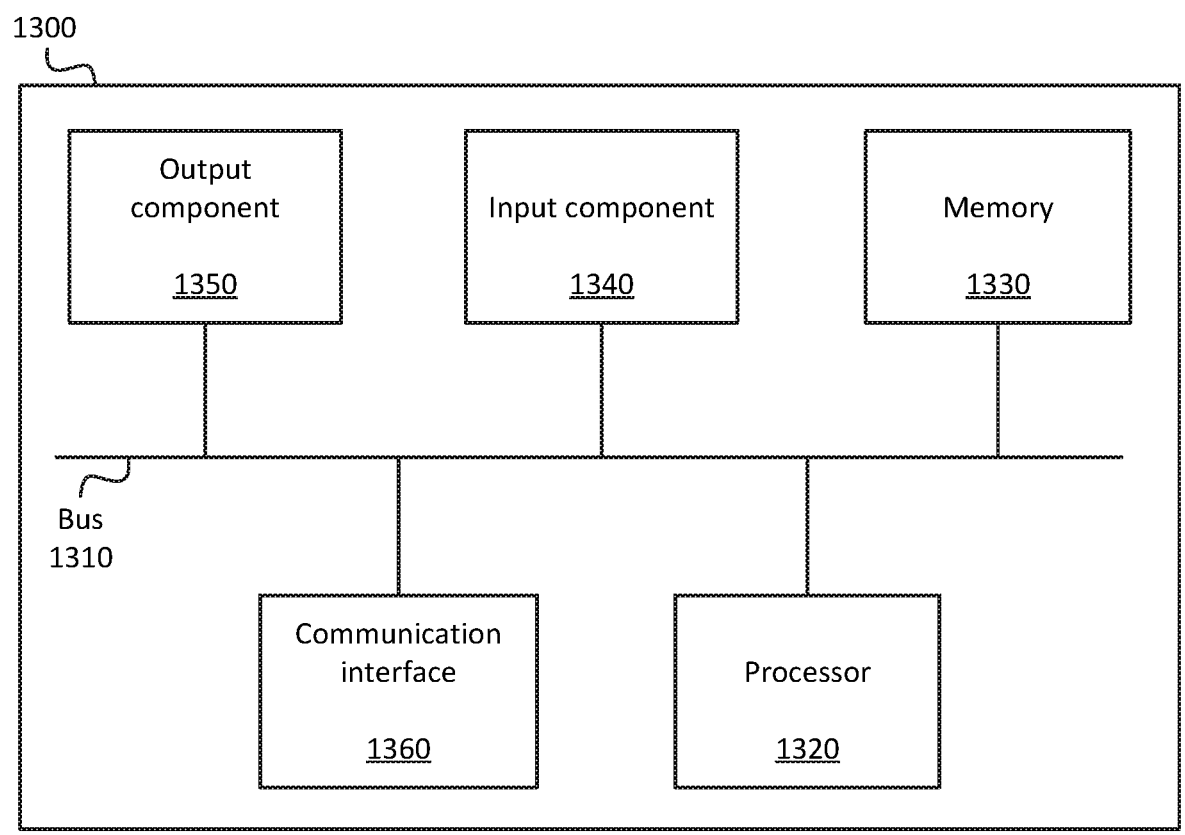
FIG. 13 illustrates example functional components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   implement a virtual environment that includes a plurality of virtual User Equipment ("vUEs") and one or more virtual radio access networks ("vRANs");
   identify a respective simulated geographical location that is associated with each vUE of the plurality of vUEs;
   determine a plurality of identifiers that are each associated with a respective one of the plurality of vUEs;
   identify a particular vRAN, of the one or more vRANs, that is associated with a particular simulated coverage area and a particular vRAN identifier;
   identify a particular set of vUEs, of the plurality of vUEs, that are each associated with a respective simulated geographical location that is within the simulated coverage area of the vRAN; and
   provide, to the vRAN, the identifiers associated with the particular set of vUEs that are associated with the respective simulated geographical locations that are within the simulated coverage area of the vRAN,
   wherein the vRAN simulates a wireless broadcasting of particular data, including the particular vRAN identifier, within the simulated coverage area of the vRAN by sending the particular data to the particular set of vUEs using the respective identifiers associated with the particular set of vUEs, wherein sending the particular data to the particular set of vUEs includes sending the particular data to each vUE of the particular set of vUEs via unicast messaging.

2. The device of claim 1, wherein the particular set of vUEs is a first set of vUEs, wherein the plurality of vUEs further includes a second set of vUEs that are not associated with simulated geographical locations that are within the simulated coverage area of the vRAN,
   wherein the simulated broadcasting the particular data by the vRAN includes forgoing sending the particular data to the second set of vUEs.

3. The device of claim 1, wherein the plurality of identifiers that are each associated with a respective one of the plurality of vUEs include a plurality of Internet Protocol ("IP") addresses that are each associated with a respective one of the plurality of vUEs.

4. The device of claim 1, wherein the simulated broadcasting of the particular data includes a simulated broadcasting of at least one of:
   a System Information Block ("SIB"), or
   a Master Information Block ("MIB").

5. The device of claim 1, wherein a particular identifier associated with a particular vUE, of the particular set of vUEs, is a first identifier of a first type,
   wherein the vRAN receives traffic to be sent to the particular vUE, the received traffic including a second identifier of a second type that is different from the first type of identifier,
   wherein the vRAN determines that the traffic is to be sent to the particular vUE based on a mapping of the second identifier to the first identifier, and
   wherein the vRAN further uses the first identifier to send the traffic to the particular vUE.

6. The device of claim 1, wherein the one or more processors are further configured to:
   provide, to the particular set of vUEs, an identifier of the vRAN based on determining that the particular set of vUEs are associated with the respective simulated geographical locations that are within the simulated coverage area of the vRAN,
   wherein a particular vUE, of the particular set of vUEs, simulates a wireless transmission of data by sending the data to the vRAN using the provided identifier of the vRAN.

7. The device of claim 1, wherein each vUE, of the plurality of vUEs, includes a virtual physical layer ("vPHY") component that simulates wireless transmission of data, provided by one or more upper layers of the vUE, by sending the data to the vRAN via a packet-switched network.

8. A non-transitory computer-readable medium, storing a plurality of processor-executable instructions to:
   implement a virtual environment that includes a plurality of virtual User Equipment ("vUEs") and one or more virtual radio access networks ("vRANs");
   identify a respective simulated geographical location that is associated with each vUE of the plurality of vUEs;
   determine a plurality of identifiers that are each associated with a respective one of the plurality of vUEs;
   identify a particular vRAN, of the one or more vRANs, that is associated with a particular simulated coverage area and a particular vRAN identifier;
   identify a particular set of vUEs, of the plurality of vUEs, that are each associated with a respective simulated geographical location that is within the simulated coverage area of the vRAN; and
   provide, to the vRAN, the identifiers associated with the particular set of vUEs that are associated with the respective simulated geographical locations that are within the simulated coverage area of the vRAN,
   wherein the vRAN simulates a wireless broadcasting of particular data, including the particular vRAN identifier, within the simulated coverage area of the vRAN by sending the particular data to the particular set of vUEs using the respective identifiers associated with the particular set of vUEs, wherein sending the particular data to the particular set of vUEs includes sending the particular data to each vUE of the particular set of vUEs via unicast messaging.

9. The non-transitory computer-readable medium of claim 8, wherein the particular set of vUEs is a first set of vUEs, wherein the plurality of vUEs further includes a second set of vUEs that are not associated with simulated geographical locations that are within the simulated coverage area of the vRAN, wherein the simulated broadcasting the particular data by the vRAN includes forgoing sending the particular data to the second set of vUEs.

10. The non-transitory computer-readable medium of claim 8, wherein the plurality of identifiers that are each associated with a respective one of the plurality of vUEs include a plurality of Internet Protocol ("IP") addresses that are each associated with a respective one of the plurality of vUEs.

11. The non-transitory computer-readable medium of claim 8, wherein the simulated broadcasting of the particular data includes a simulated broadcasting of at least one of:

a System Information Block ("SIB"), or a Master Information Block ("MIB").

12. The non-transitory computer-readable medium of claim 8, wherein a particular identifier associated with a particular vUE, of the particular set of vUEs, is a first identifier of a first type, wherein the vRAN receives traffic to be sent to the particular vUE, the received traffic including a second identifier of a second type that is different from the first type of identifier, wherein the vRAN determines that the traffic is to be sent to the particular vUE based on a mapping of the second identifier to the first identifier, and wherein the vRAN further uses the first identifier to send the traffic to the particular vUE.

13. The non-transitory computer-readable medium of claim 8, wherein the plurality of processor-executable instructions further include processor-executable instructions to:

provide, to the particular set of vUEs, an identifier of the vRAN based on determining that the particular set of vUEs are associated with the respective simulated geographical locations that are within the simulated coverage area of the vRAN, wherein a particular vUE, of the particular set of vUEs, simulates a wireless transmission of data by sending the data to the vRAN using the provided identifier of the vRAN.

14. The non-transitory computer-readable medium of claim 8, wherein each vUE, of the plurality of vUEs, includes a virtual physical layer ("vPHY") component that simulates wireless transmission of data, provided by one or more upper layers of the vUE, by sending the data to the vRAN via a packet-switched network.

15. A method, comprising:

implementing a virtual environment that includes a plurality of virtual User Equipment ("vUEs") and one or more virtual radio access networks ("vRANs");

identifying a respective simulated geographical location that is associated with each vUE of the plurality of vUEs;

determining a plurality of identifiers that are each associated with a respective one of the plurality of vUEs;

identifying a particular vRAN, of the one or more vRANs, that is associated with a particular simulated coverage area and a particular vRAN identifier;

identifying a particular set of vUEs, of the plurality of vUEs, that are each associated with a respective simulated geographical location that is within the simulated coverage area of the vRAN; and providing, to the vRAN, the identifiers associated with the particular set of vUEs that are associated with the respective simulated geographical locations that are within the simulated coverage area of the vRAN, wherein the vRAN simulates a wireless broadcasting of particular data, including the particular vRAN identifier, within the simulated coverage area of the vRAN by sending the particular data to the particular set of vUEs using the respective identifiers associated with the particular set of vUEs, wherein sending the particular data to the particular set of vUEs includes sending the particular data to each vUE of the particular set of vUEs via unicast messaging.

16. The method of claim 15, wherein the particular set of vUEs is a first set of vUEs, wherein the plurality of vUEs further includes a second set of vUEs that are not associated with simulated geographical locations that are within the simulated coverage area of the vRAN, wherein the simulated broadcasting the particular data by the vRAN includes forgoing sending the particular data to the second set of vUEs.

17. The method of claim 15, wherein the plurality of identifiers that are each associated with a respective one of the plurality of vUEs include a plurality of Internet Protocol ("IP") addresses that are each associated with a respective one of the plurality of vUEs.

18. The method of claim 15, wherein the simulated broadcasting of the particular data includes a simulated broadcasting of at least one of:

a System Information Block ("SIB"), or a Master Information Block ("MIB").

19. The method of claim 15, the method further comprising:

providing, to the particular set of vUEs, an identifier of the vRAN based on determining that the particular set of vUEs are associated with the respective simulated geographical locations that are within the simulated coverage area of the vRAN, wherein a particular vUE, of the particular set of vUEs, simulates a wireless transmission of data by sending the data to the vRAN using the provided identifier of the vRAN.

20. The method of claim 15, wherein each vUE, of the plurality of vUEs, includes a virtual physical layer ("vPHY") component that simulates wireless transmission of data, provided by one or more upper layers of the vUE, by sending the data to the vRAN via a packet-switched network.

\* \* \* \* \*